(12) United States Patent
Jaeger

(10) Patent No.: US 7,216,305 B1
(45) Date of Patent: May 8, 2007

(54) STORAGE/DISPLAY/ACTION OBJECT FOR ONSCREEN USE

(76) Inventor: Denny Jaeger, 6120 Valley View Rd., Oakland, CA (US) 94611

( * ) Notice: Subject to any disclaimer, the term of this patent is extended or adjusted under 35 U.S.C. 154(b) by 654 days.

(21) Appl. No.: 10/134,401

(22) Filed: Apr. 29, 2002

Related U.S. Application Data

(63) Continuation-in-part of application No. 09/880,397, filed on Jun. 12, 2001, now Pat. No. 6,883,145, which is a continuation-in-part of application No. 09/785,049, filed on Feb. 15, 2001.

(51) Int. Cl.
*G06F 3/048* (2006.01)
*G06T 15/00* (2006.01)

(52) U.S. Cl. .............. 715/849; 715/848; 715/836; 715/769; 715/723; 715/976; 715/863; 715/716; 345/419

(58) Field of Classification Search ........ 715/848–852, 715/769, 835, 976, 836, 764, 765, 771, 773, 715/716, 719, 720, 723, 724, 782, 810, 837, 715/841, 853, 854, 855, 863, 856, 862, 725, 715/726, 500.1, 530; 345/419, 427
See application file for complete search history.

(56) References Cited

U.S. PATENT DOCUMENTS

| | | | |
|---|---|---|---|
| 5,148,154 A * | 9/1992 | MacKay et al. ............ 715/782 |
| 5,452,414 A * | 9/1995 | Rosendahl et al. ......... 715/836 |
| 5,485,197 A * | 1/1996 | Hoarty ................... 715/848 X |
| 5,515,486 A * | 5/1996 | Amro et al. ............... 715/848 |
| 5,649,080 A * | 7/1997 | Minakata .................... 345/427 |
| 5,724,492 A | 3/1998 | Matthews, III et al. ..... 395/119 |
| 6,335,740 B1 | 1/2002 | Tanaka ....................... 345/764 |
| 6,621,509 B1 * | 9/2003 | Eiref et al. ................. 715/836 |
| 2002/0033849 A1 * | 3/2002 | Loppini et al. ............ 345/848 |
| 2002/0067378 A1 * | 6/2002 | Abdelhadi et al. .......... 345/836 |

\* cited by examiner

*Primary Examiner*—Raymond J. Bayerl
(74) *Attorney, Agent, or Firm*—Harris Zimmerman

(57) ABSTRACT

A method for storing, displaying, and retrieving user-selected portions of software application data, display, and functional operations includes one or more 3-D objects portrayed on a computer display. The 3-D object has various onscreen data, 3-D object, text portion, switch, video/audio clip, or the like assigned to and displayed on facets of the 3-D object. The 3-D object is rotatable about at least one axes, so that each one of the six surfaces of the 3-D object may be brought into full visualization, while two other surfaces are partially visible. A plurality of 3-D objects may be combined for functional operations among corresponding files stored on the 3-D objects.

5 Claims, 11 Drawing Sheets

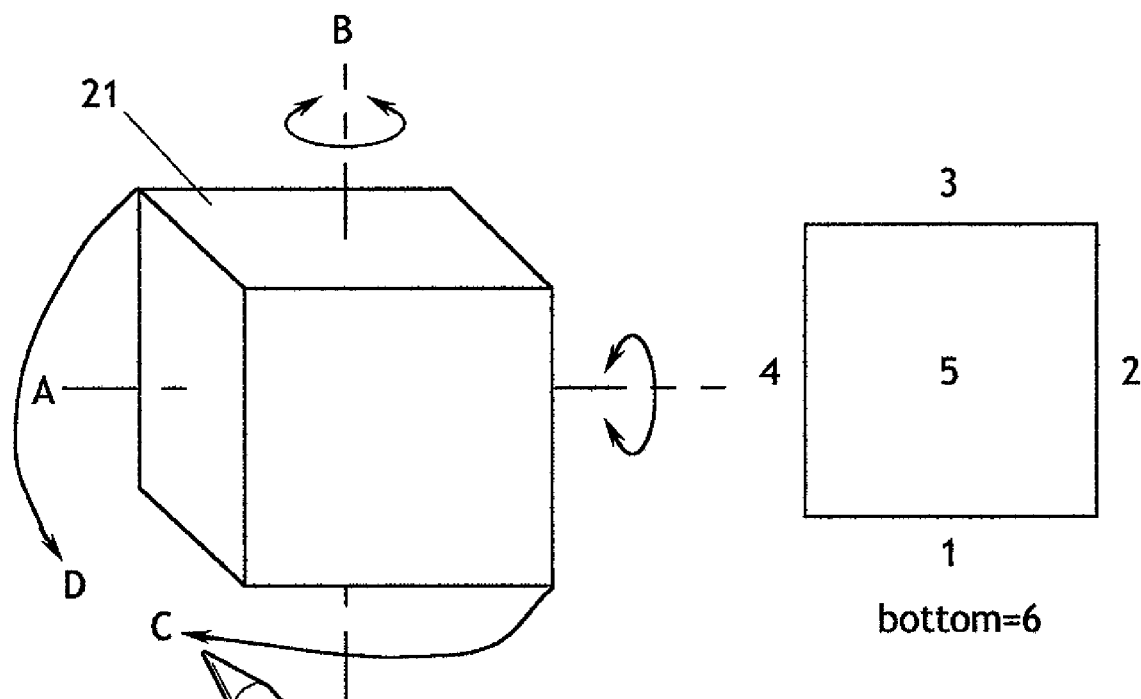
FIG. 1A
FIG. 1B
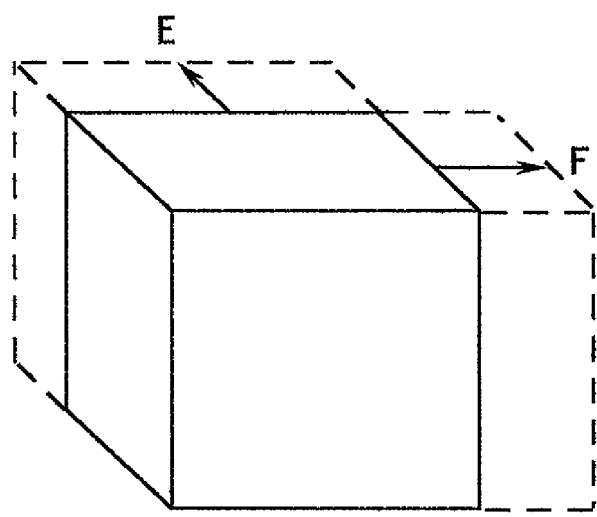
FIG. 2

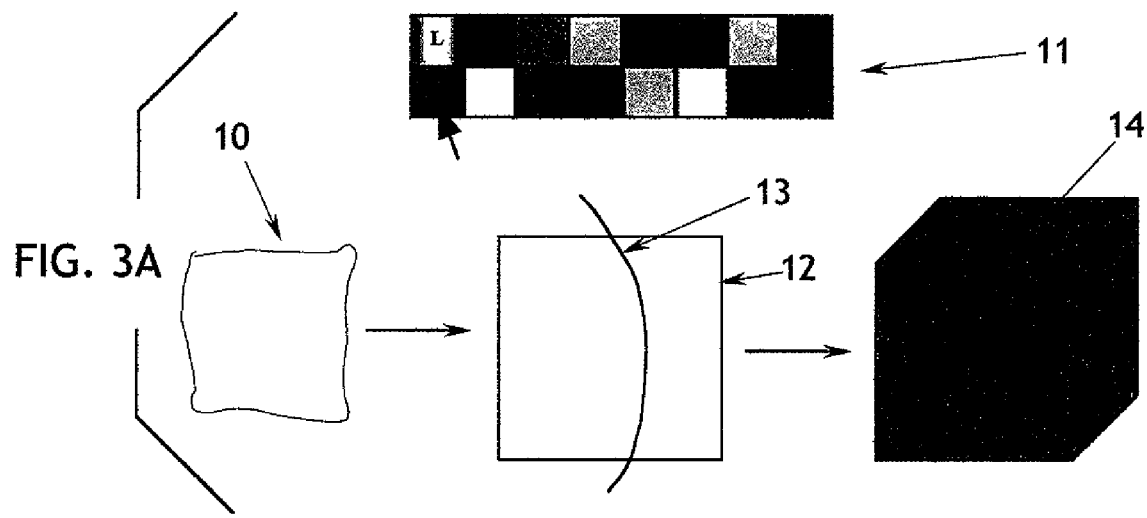
FIG. 3A
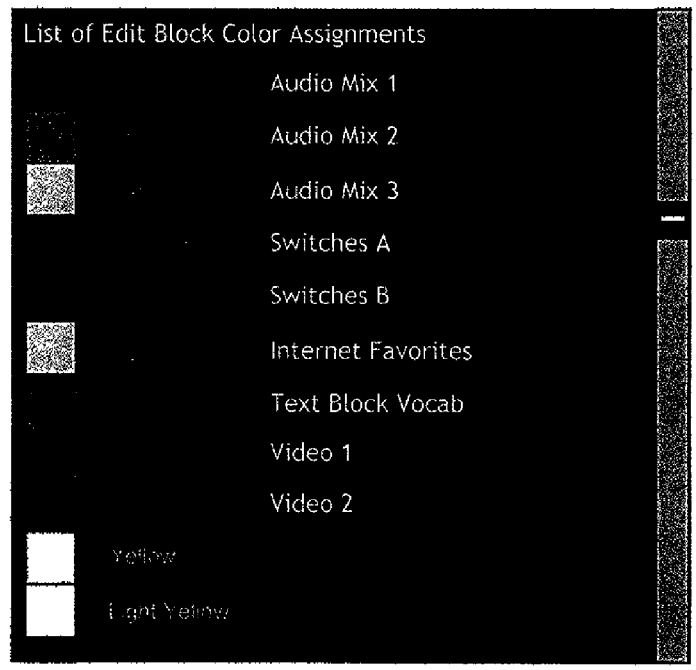
FIG. 3B
FIG. 3C

Image 1

STORAGE/DISPLAY/ACTION OBJECT FOR ONSCREEN USE

REFERENCE TO RELATED APPLICATION

This application is a continuation-in-part of U.S. patent application Ser. No. 09/880,397, filed Jun. 12, 2001, now U.S. Pat. No. 6,883,145, which is a continuation-in-part of U.S. patent application Ser. No. 09/785,049, filed Feb. 15, 2001, for which priority is claimed. The entireties of the prior applications are incorporated herein by reference.

BACKGROUND OF THE INVENTION

The present invention relates to methods and devices, in a computer having a display screen, for storing, retrieving, and performing operations with objects that are portrayed on the display and/or stored in the computer.

Computer programs currently available for personal or commercial use have evolved in the last few decades in a Darwinian model. Early forms made the best possible use of the limited technical features of their epoch, primarily limited memory and slow processor speeds. As these technical limitations were overcome by engineering developments, the early forms of software applications were expanded in power and features, but it is significant that the early format was generally retained.

For example, word processing programs initially had rudimentary capacity for moving text portions or storing text portions for cut and paste, or copy and paste procedures. The clipboard concept was introduced to make use of limited memory to carry out these functions, and were limited to storing and processing one designated text portion. Current cut/copy and paste procedures have generally retained this limitation, and are able to copy only one file to a clipboard and thereafter paste it as many times as desired. A problem often arises in dealing with a text document of some length, e.g., 25 pages, when it becomes necessary to move words, phrases, sentences and paragraphs from one part of the document to determine if they work better in another part of the document. And one may wish to move multiple parts of multiple pages to multiple insert points on multiple pages. This is fairly common in word processing, but the current copy/paste approach is actually very inefficient for such tasks.

In fact, it is commonplace for computer users to make a "hard copy" (paper printout) of their document (such as the 25 page example) and then edit it with pen or pencil on paper. When it is necessary to reorganize and edit a long document, the hard copy edit seems for many to be the most intuitive way to explain to someone what type of reorganization is required. Thus the putative advantages of a computer word processing system are nullified, at least for this procedure.

To copy one section of text at a time and then scroll forward or backward in a text document and then paste that text to see if it works is tedious for many reasons: (1) one can only copy and paste one thing at a time (one word, one group of sentences), (2) in most systems one cannot copy one word of a sentence and then skip some words and then add to that "copy" some other words that are not contiguous—you must copy contiguous text, (3) you must copy contiguous sentences and paragraphs, 4) whatever is copied is always text—it cannot be changed to another form, such as a functional object.

Another common problem with word processing editing involves the ability to easily navigate from one page of text, graphics, video, pictures and another. One common method of accomplishing this process is to "drag" text, objects, pictures, video clips, etc. from one page in a file to another. The problem with this method is that the more text portions one must drag between pages or documents the longer it takes, because there is usually a "set" scrolling speed (onscreen) for "dragging" things. The other popular method for accomplishing this task is to cut and paste text, objects, graphics, video clips, etc.

The clipboard concept and the edit bin, both commonly used at the present time, do not provide easy visualization of that which has been stored. Often the clipboard may be accessed via a pull-down menu, so that it displays in a window the item being temporarily stored for subsequent use. In many programs, the user may inadvertently overwrite and lose a stored item by designating another item as a cut/copy selection. That is, only one item may be visualized, and visualization is only possible by commanding it through a pull-down selection.

An easier and more immediate way to navigate between multiple pages of a file or document is the use of Go To commands. Some programs do utilize Go To's, but they are cumbersome to use and involve finding the Go To function in a pull down menu and then activating it.

Looking at software systems from a broader perspective, it is generally difficult to transfer portions from the onscreen display of one program to another, particularly when the software operates in different realms, such as word processing, audio processing, graphics, image processing, video processing, and the like. The ability to integrate these diverse media seamlessly is a long-sought goal of software development, but the conceptualization of each media function as a separate entity creates obstacles to the objective of complete integration.

SUMMARY OF THE INVENTION

The present invention generally comprises a method for use in a computer having a display for storing, displaying, and retrieving user-assigned items, such as text, audio/video/photo files, functional devices such as audio mixers, or video editors, and onscreen objects that embody functional tasks or stored files.

The fundamental aspect of the invention is the provision of a perspective view of a three dimensional object, which could be any 3-D object, i.e., a sphere, a dodecahedron, a cube, portrayed on a computer display, the 3-D object (hereinafter "cube") comprising a storage device for any form or format of onscreen data, object, text portion, switch, video/audio clip, or the like (hereinafter, items). The cube is rotatable about two or more axes by simple arcuate inputs applied to the vertices of the cube, by mouse, pen or finger on touch screen, pointer, or the equivalent. Thus each of the six surfaces of the cube may be brought into full visualization, while two other surfaces are partially visible. Each surface of the cube may be used to store one or more items for future use, whereby a large plurality of items may be stored and visualized onscreen without recourse to pull-down menus. The cube may be resized in any direction by dragging the respective side of the figure.

"Stored" as used herein means placing, agglomerating, associating, gluing, or assigning one or more items to any object, such that these "stored" items may be viewed, recalled, deleted, edited, resized, etc., or applied to some function or action or the like, or additionally stored in and/or on another object(s). For example, a picture may be stored in a folder, or in an object, such as a star, or in the facet of a cube. It could also be visible on the surface of the folder, star or cube, but this is not a requirement. Going one step further, this picture may be stored in a folder which is stored in a star, which is in turn stored on the facet of a cube.

"Assigning" is the process of associating an item with another item, such as text, graphic objects, devices (i.e., faders, switches, knobs, joysticks), pictures, video, audio, data files, holographic files, etc. This process may be user definable and may be carried out by the user. "Assignment" is the association between one item and another, a status that may be depicted visually by displaying the one item or its representation on the surface of the other item, or may not be visible at all.

There are several methods that may be used to assign items to any selected facet of a cube. One technique involves the use of arrow logics, described in U.S. patent application Ser. No. 09/880,397, filed Jun. 12, 2001 now U.S. Pat. No. 6,883,145. Briefly, in this technique a line or arrow is drawn that has a transaction assigned to it, the transaction being "take the items(s) at the tail of the arrow or line and assign them to the object at the head of the arrow or line." This arrow or line is extended from an onscreen item to a facet of the cube, whereby the item becomes assigned to that facet. The item can be portrayed on that facet by automatically assigning the onscreen item's image to the facet or by hand drawing, placing a picture, typing text, dragging text, and the like, so that the presence of the onscreen item is signified by visualization by the user. Note: The assignment to the facet is not necessarily controlled by the portrayal (label) placed on the facet. This can be purely for the user's reference. Note: an onscreen item is any text, graphic, picture, device, video, audio, data, compilation or group of any of the above that can be accessed from onscreen, whether or not it is visible at the time, and whether or not it is on a visible or invisible facet of an edit block or cube, or in a list, menu, info window, or anything that provides a graphic representation of an object.

Thereafter, the user may select any item from the cube by tapping or clicking on the item on the facet of the cube (or the representation of the item that has been placed on the facet), causing the item and/or its contents to be available for use. Likewise, an arrow logic may be used to take an item from a facet of a cube and direct it for use onscreen or in combination with any other onscreen item that is on display or stored in the system.

Another technique for storing an item on a cube involves drawing an object directly onto a facet of a cube, the object having been assigned a meaning, a transaction, or a content. For example, the user may draw a star onto a facet of a cube, the star being an object that has assigned to it a content, such as a page of text, or a video file, or a functional processing routine, or the like. The user may then tap or click on the object (the star in this case) to evoke a display of the content of the object, so that it may be visualized by the user for easy recall.

A further method for assigning items to a cube involves typing or writing the name of the item directly on the facet of the cube to which it will be assigned. The system can automatically resize the item (such as an image) to be displayed completely on the facet of the cube.

The invention includes the provision of a plurality of cubes, each displayed in a respective color, whereby the storage and display capacity (six facets per cube) may be multiplied by the number of cubes displayed. Each cube may be addressed separately by use of an onscreen inkwell for cubes that enables selection of the color of a respective cube. The user may select a color, then draw a cube onscreen. (The system may be programmed to accept the drawing of a square with an axis line extending therethrough, or a square with an arc segment extending therethrough, or the like, as a command to place a perspective rendering of a storage/display/action cube onscreen in the selected color.)

Cubes may be combined functionally to achieve a desired result. A plurality of cubes containing sound files may be assembled on a play line, the order of play determined by their order along the play line to establish a mix of the files. Mixes may be easily changed by dragging to change the order of the cubes, or by substituting cubes on the play line, or by rotating one or more cubes on the play line to present a different active facet with different audio files assigned thereto. Note: For practical use the user may designate any facet of a cube or all of the facets of a cube can be active at the same time. All facets can have items assigned to them at any time or have items accessed, recalled, etc. For purposes of using edit blocks (not general purpose cubes), the term "active facet" refers to the facet that is directly facing the user—the facet having the largest area in the perspective view of said 3-D object.

The entire contents of any cube may be listed by right clicking and selecting a Convert Edit Block to List command, or the contents of one facet may be listed by double clicking on that facet or its equivalent. The process may be reversed by first listing items to be assigned to one or more facets of a cube, and then selecting a command Convert List to Edit Block.

BRIEF DESCRIPTION OF THE DRAWING

FIG. 1A is a perspective rendering of a storage/display/action cube of the invention, showing the axes of rotation and rotational possibilities, and FIG. 1B depicts the numbering of the facets of the cube.

FIG. 2 is a perspective view of a storage/display/action cube of the invention, showing the potential for resizing the cube in two directions.

FIG. 3A is a graphical depiction of the creation of a cube onscreen, FIG. 3B is a depiction of a name dialog box for the cube, and FIG. 3C is an Info Window showing the list of edit block color assignments.

DESCRIPTION OF THE PREFERRED EMBODIMENT

Figure 4:
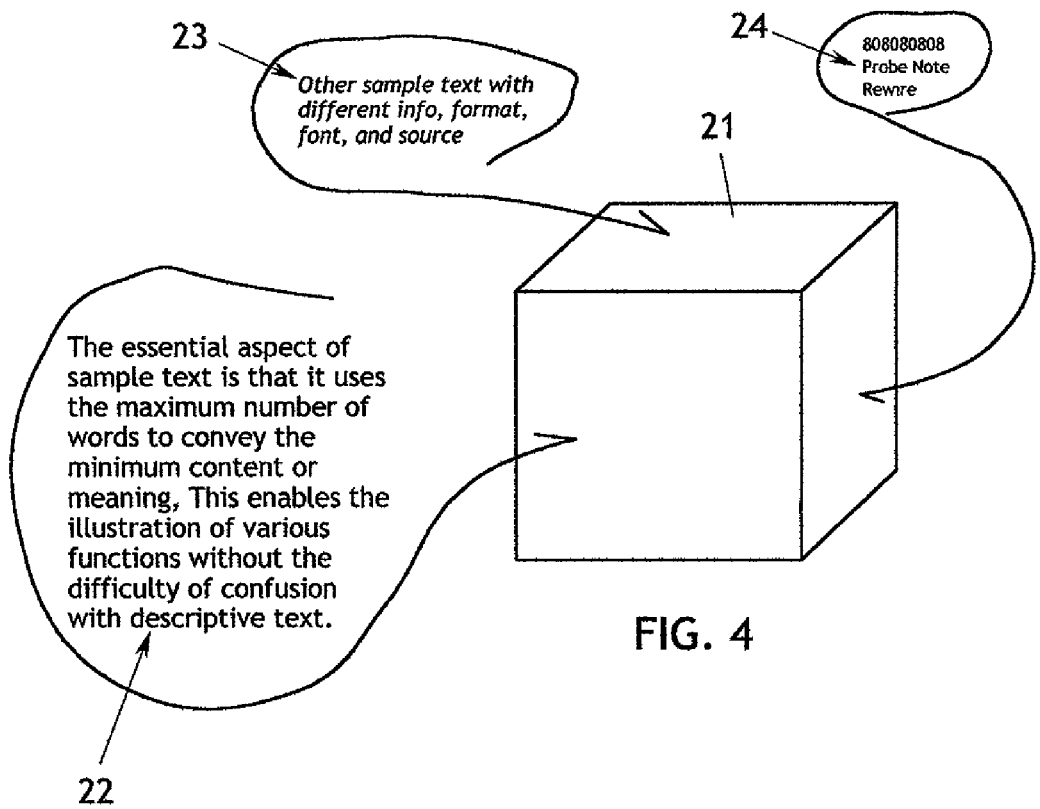
FIG. 4 is a perspective view of a storage/display/action cube having text objects assigned to it via arrow logics.

The present invention generally comprises a method for storing, displaying, and retrieving user-selected portions of text, data, displayed objects, actions, animations, video, functional operations, etc. The method is designed to operate on a computer having a display and a user input device, such as a mouse, track pad, touch screen, or the like which enables user interaction with the display. With regard to FIG. 1A, the invention provides a cube 21 displayed onscreen in perspective view, so that three facets of the cube are visible at all times. Each facet is capable of storing and displaying and manipulating a large number of items, as will be explained in the following description. The facets of the cube can be numbered in any fashion, one of which is shown in FIG. 1B, for easy identification. The cube 21 may be rotated onscreen about two or more axes, i.e., A and B (horizontal and vertical), so that all facets may be brought into full or partial visualization. Rotation is accomplished by clicking on or touching a vertex of the cube 21, and dragging the vertex toward one of the axes A or B. Thus the touch and drag indicated by path C causes the cube 21 to rotate clockwise about axis B, and the path D causes the cube 21 to rotate about axis A. Any vertex may be touched and dragged to rotate the cube about an axis.

The facets of the cube 21 are numbered 1–6, with the facets 1, 2, 3, and 4 disposed in annular array about the cube, and facets 5 and 6 comprising the top and bottom facets, respectively, in relation to the annular array, as shown in FIG. 1B.

The cube 21 may be resized as desired by the user. As shown in FIG. 2, the cursor or pen tip may be placed on an edge of the cube and dragged outwardly, as shown by vectors E or F, to extend the edge outwardly and expand the related facets. This technique may provide additional space for display of items assigned to the facets of the cube 21, as described below. Note: as previously mentioned, the use of a cube is for example only. Any three dimensional solid object may be rendered onscreen and have items assigned to its surface(s), and resized, rotated, assigned to, etc., as described in this disclosure.

Likewise, a cube may be diminished by dragging an edge or corner of the cube inwardly. All items already displayed on the facets of the cube are expanded or diminished in proportion to the changing sizes of the facets, and are rendered as detailed as possible to maintain the visual indications of the items stored thereon.

In all description herein, the terms "cube," "storage/display/action cube," and "edit block" are all used interchangeably to indicate the same type of onscreen device. "Items" refers to any form or format of onscreen data, object, text portion, switch, video/audio clip, device, i.e., fader or knob, or the like.

With regard to FIG. 3A, a cube may be drawn onscreen by first selecting a color for the cube from a cube inkwell 11, or color palette. In this example, dark green is chosen, as indicated by the cursor superimposed on that color selection. The user then hand draws a square 10, which is recognized by the system and rendered as a perfect square 12. The user then draws an arcing line 13 extending vertically through the square, intersecting the top and bottom of the square, and this is recognized as a command for a cube display. The cube 14 is then displayed in the selected color, and a dialog box (FIG. 3B) may appear to request a name for the new cube. A name is entered and assigned to the dark green cube (edit block). The user may access a list of edit block color assignments (FIG. 3C) at any time by right-clicking on any cube onscreen. Note that the dark green cube is assigned to "Text Block Vocab," as was input into the dialog box. This technique for calling forth a cube onscreen may also be used to recall a previously created cube, including whatever assignments have been made to it. Selecting a color in the inkwell (such as blue), and drawing the cube as shown in FIG. 3A, may recall a cube such as the one shown in FIG. 12.

Items may be assigned to various facets of a cube 21 to form a storage/display/action device that remains onscreen to prompt the user with the items available. With regard to the example of FIG. 4, various text portions may be assigned to user-selected facets. In this example, arrow logic techniques are used to make the assignments. A line or arrow is drawn that has a transaction assigned to it, the transaction being "take the items(s) at the tail of the arrow or line and assign them to the object at the head of the arrow or line." This transaction is typically associated with a particular color chosen for the line or arrow. The arrow logic line or arrow is extended from an onscreen text portion to a selected facet of the cube 21, whereby the item becomes assigned to that facet. In this way any type of text, i.e., different versions of the same document to be used for comparisons, or disparate text portions or documents, can be assigned to any facet of a cube.

Figure 5A:
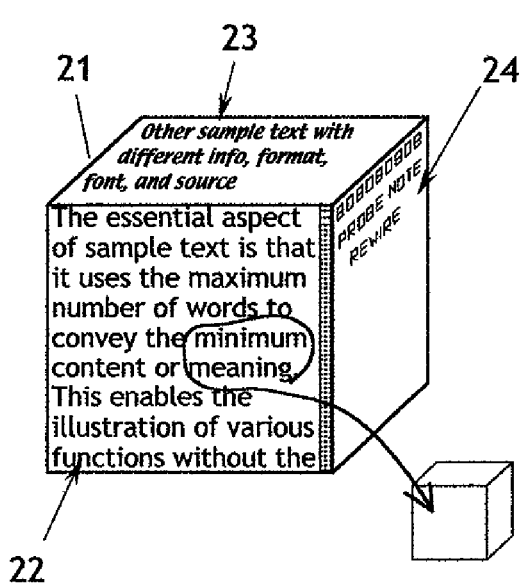
FIG. 5A is a perspective view of the cube of FIG. 4, showing the cube displaying the elements assigned to it.

With regard to FIG. 5A, each item is portrayed on the facet to which it is assigned, so that its presence may be visualized by the user. Thus text portion 22 is displayed on the fully displayed facet, text portion 23 is displayed in proper perspective on the facet displayed at the top of the cube, and text portion 24 is displayed in proper perspective on the facet visible at the left. Note that the text portion 22 is too large to be viewed in its entirety, and the system automatically adds a scroll bar to that facet so that all the text may be accessed. (Any item too large to be displayed on a facet to which it is assigned will automatically have a scroll bar placed on the facet to permit full visualization.)

Figure 5B:
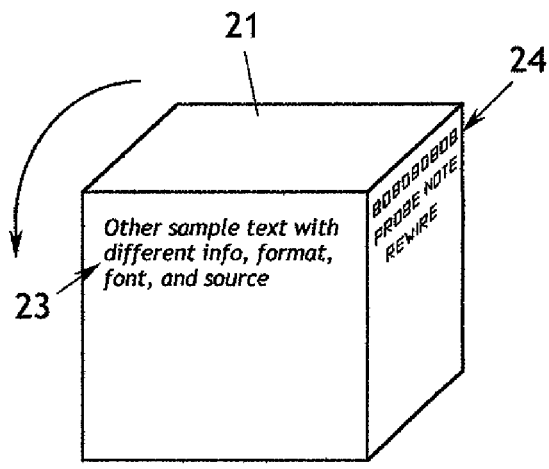
FIG. 5B shows the same cube rotated about the horizontal axis.

As shown in FIG. 5B, if the cube of FIG. 5A is rotated forward about a horizontal axis (the A axis of FIG. 1), the facet displaying text portion 22 is at the bottom, and is not visible. The facet displaying text portion 23 is fully visualized. Note that the facet displaying text portion 24 remains visualized as in FIG. 5A. Text portion 24 has not been rotated 90° to a less readable disposition, even though the facet displaying text portion 24 has been rotated through a 90° angle. Thus, in general, the items displayed on the obliquely visible facets are rendered in perspective, but remain in an upright orientation to preserve readability of alphanumeric characters and user recognition of graphics and symbols. Thus the cube may be rotated to view the contents of any facet thereof.

The user may take any word or group of words from any text visible on the cube 21 and place it onscreen or place it into a text block or any other onscreen object. To accomplish this, the user may draw an arrow or arrow logic line from the word or words on the block facet to the onscreen object. For example, the words "minimum meaning" may be selected and placed by arrow logic onto a facet of the green cube of FIG. 5A. Likewise, these words may be inserted into another text block by directing the arrow head to the point of insertion in the text block.

Figure 6:
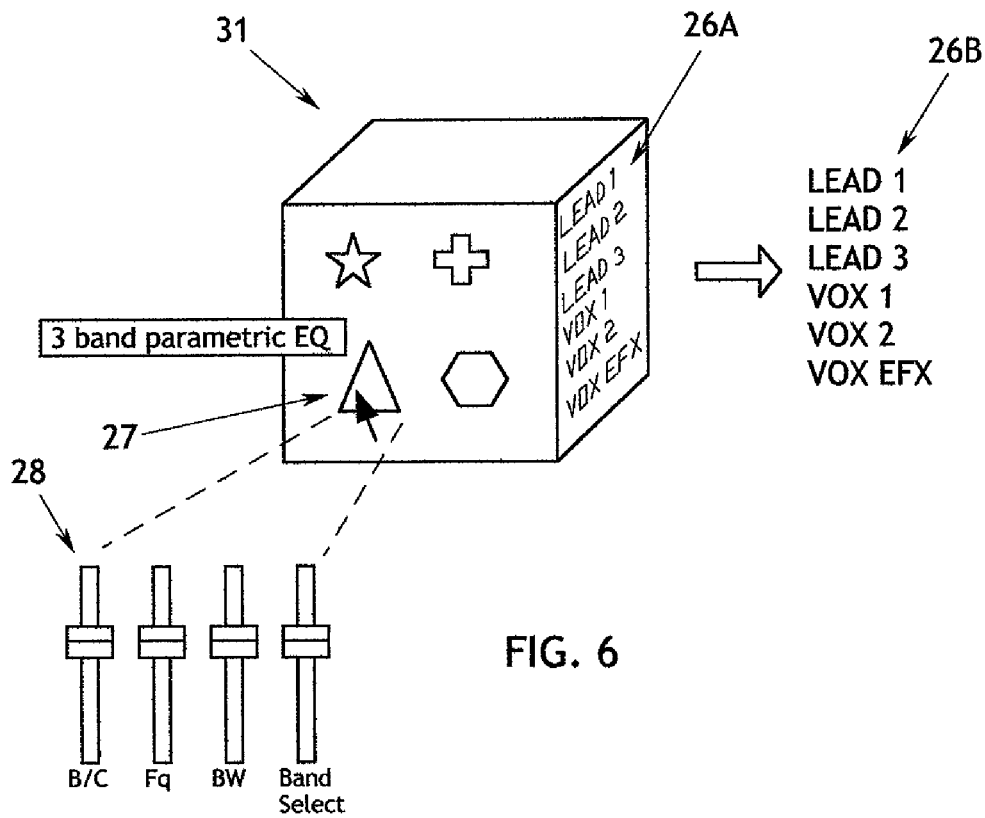
FIG. 6 is a depiction of a storage/display/action cube, depicting techniques for accessing elements stored on visible facets of the cube.

The user may select any item from a cube by verbal command, context, or tapping or clicking on the item on the facet of the cube, causing the item to "pop-up" onscreen and be available for viewing and use. As shown in FIG. 6, tapping on displayed items 26A of cube 31 causes the displayed items (a plurality of audio tracks) to be displayed in a column list adjacent to the facet on which it was stored and displayed. If the list 26B is dragged to another location onscreen, the new location is where the list 26B will appear next when 26A is tapped again.

Alternatively, the user may place a cursor arrow on an object stored on a cube facet, as shown on the triangle object 27 of FIG. 6. The system responds by displaying a name, title, or description (in this example, "3 band parametric EQ"), as shown in FIG. 6, indicating the functional device that has been assigned to the triangle object. Tapping or clicking causes the assigned device to pop-up adjacent to the facet, as indicated in FIG. 6. Thus the 3 band parametric equalization device 28 is displayed and ready for use when the triangle object is tapped or clicked. The device 28 may then be employed in combination with audio files, such as the audio files 26B, or any other audio files or sources that are available. A functional device is any graphic object that is drawn, recalled, copied, or otherwise called forth onscreen, and is capable of invoking an action, process, association, link, network, layout, and the like.

Figure 7:
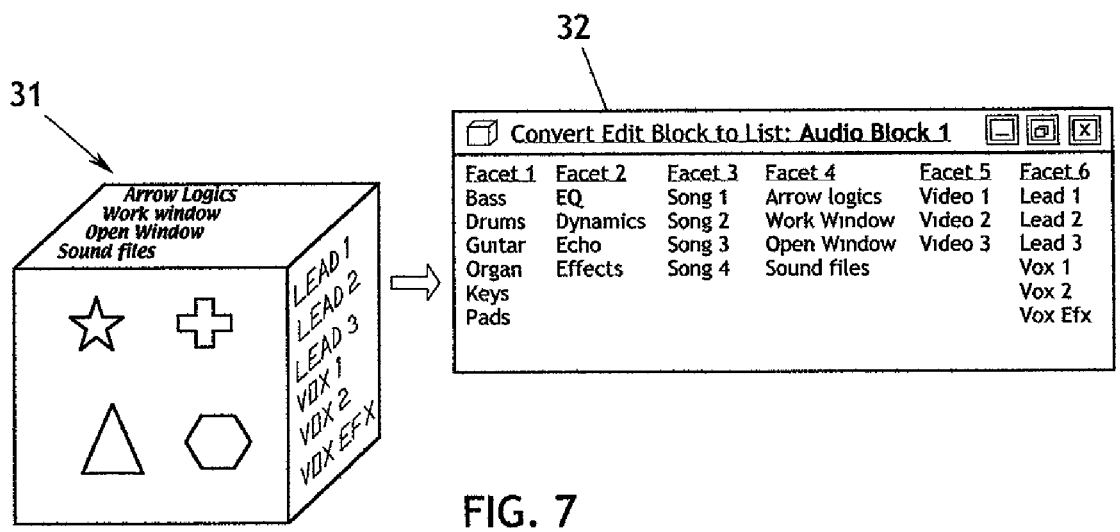
FIG. 7 is a depiction of one technique for displaying all elements stored on one cube.

With regard to FIG. 7, a user may also survey the contents of a storage block by right clicking (or the equivalent) on the block 31 and selecting "Convert Edit Block to List." This command or its equivalent causes the system to generate a display of all contents of all facets of cube 31 in a list format within a window 32. The window may include typical close, expand, and minimize command icons, as well as a cube icon. The lists can be edited by addition or removal of transposition of any items. After editing, touching or clicking the cube icon causes the edits to be applied to the facets of the cube. Another technique for applying changes in the displayed list 32 is to draw a line or arrow with the logic: "assign the contents of the object at the start of the arrow to the object at the arrow end of the arrow".

Likewise, the user may reverse this process and right click on an empty cube and select "Convert List to Edit Block" or its equivalent. This action calls forth an empty cube and an empty list in a window that is titled "Convert List to Edit Block". The user may then fill in items to be assigned, or use arrow logic, to assign items to one or more facets of the empty cube. Upon touching or clicking the cube icon at the heading of the window, the listed items are assigned and displayed on the respective facets of the previously empty cube.

Alternatively, double clicking on any one facet can cause the facet list to appear adjacent to the selected facet, without calling forth the lists for all the facets of the cube.

Figure 8A:
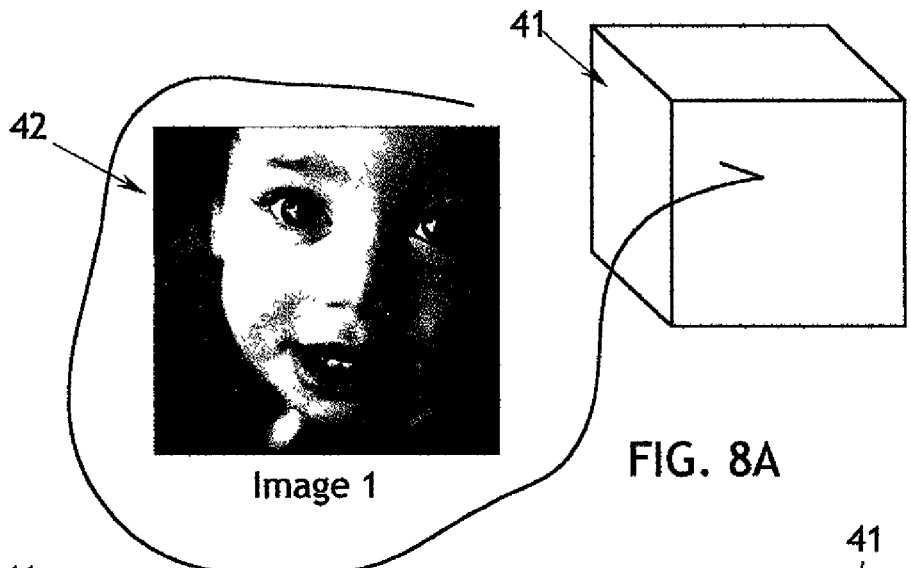
FIGS. 8A–8E are a sequence of views showing techniques for assigning and displaying a photo on a storage/display/action cube.
Figure 8B:
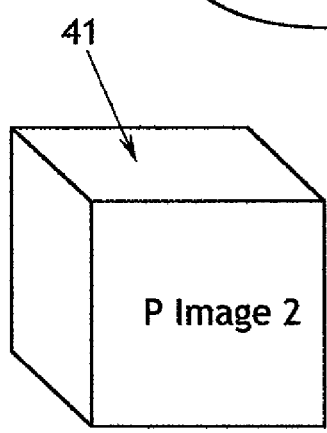

Note: any object, graphic, text, picture, video, data, document, simple device (i.e., a switch, knob or fader) or complex device (i.e. medical or test equipment), compilations of any of the above, or the like can be assigned to any facet of a cube. In one method for assigning an image or graphic to a facet of a cube, shown in FIG. 8A, a photo 42 is assigned via an arrow logic to any visible facet of cube 41. Alternatively, as shown in FIG. 8B, the user may type or write "P image 2" on the facet of the cube 41, the "P" indicating picture, and "Image 2" the title or identification of the picture. A third approach, shown in FIG. 8E, involves dragging the picture to overlap a cube facet such that the pen tip or mouse cursor tip is released on top of that facet. Upon this release, the picture would be assigned to that facet. Note: the picture may be automatically scaled to fit the facet (especially useful if the picture is larger than the facet) or resized manually directly on the facet to any desired size within the facet.

Figure 8C:
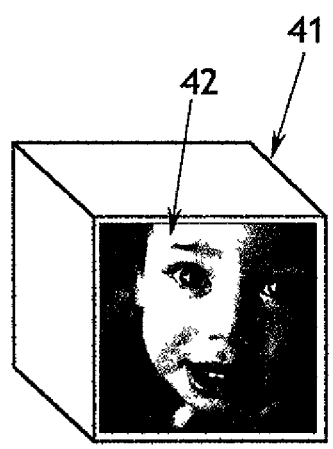
Figure 8D:
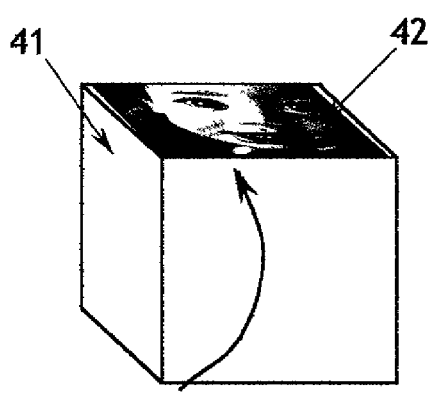
Figure 8E:
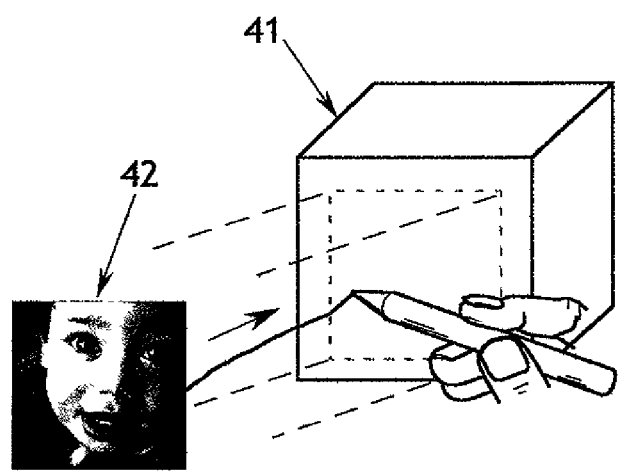

Using any of these techniques, the photo 42 is placed on the selected facet, and scaled to fill the facet, as shown in FIG. 8C. If cube 41 is rotated upwardly about the horizontal axis, as shown in FIG. 8D, the photo 42 is skewed to fit the perspective view of the top facet of the cube. With reference to FIG. 8E, a photo may be touched and dragged to a facet of cube 41. The photo 42 can be stored on cube 41, and used at any time by dragging it from the cube or directing it with arrow logics to the intended use. Using the above methods multiple photos can be assigned to any one facet of a cube. These photos can be assigned to other objects or placed in emails, letter documents, presentation documents, manuals, books, etc., by dragging, by sequential touching, by drawing lines or arrows, or by verbal commands.

Figure 9:
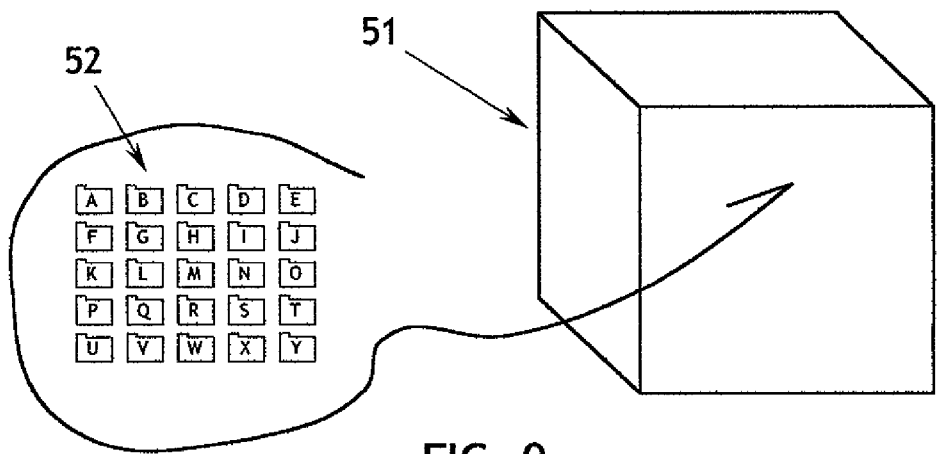
FIG. 9 is a depiction of the assignment of an array of file folders to a facet of a storage/display/action cube.
Figure 10:
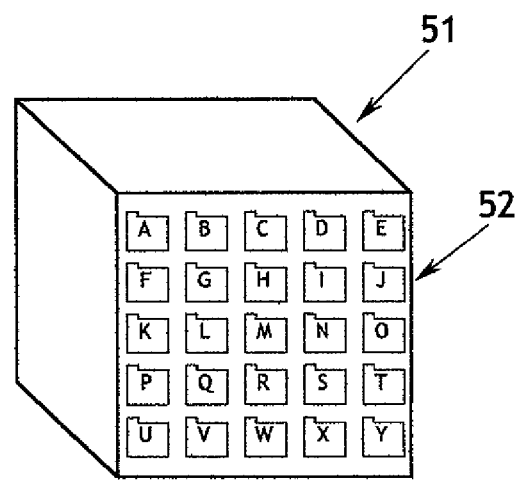
FIG. 10 is a depiction of the cube of FIG. 9, displaying the assigned folders.

With regard to FIG. 9, one or more folders may be assigned to each cube facet. For example, an array of folders 52 may be assigned to a facet of cube 51 using an arrow logic, as described previously, resulting in the facet array shown in FIG. 10. Each folder may be labeled alphabetically for storage of alphabetized items, or labeled with any other title or description. These folders may be user-defined, for example, to be an address book or a calendar or both. For instance, a list of "A" addresses could be assigned to the "A" folder by using an assign arrow or line or any other method described herein. Likewise, a list of "B" addresses could be assigned to the "B" folder and so on.

Figure 11:
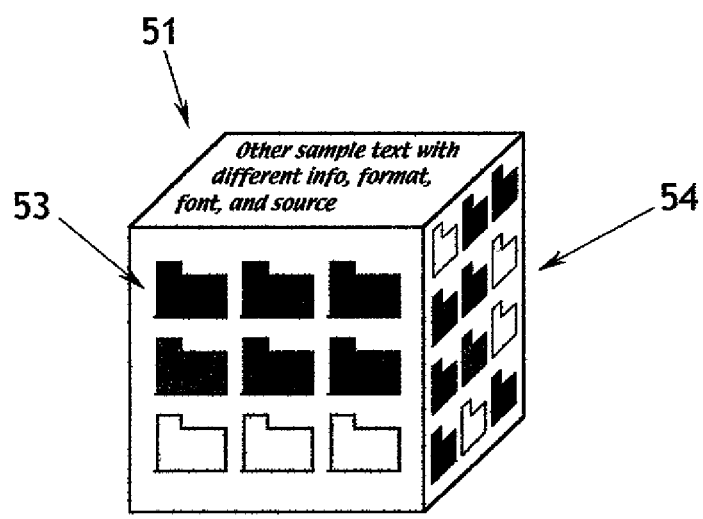
FIG. 11 is a depiction of a cube bearing folders and other elements on various visible facets of the cube.

In addition, one or more folders may be drawn directly onto a facet, and thereafter assigned to and then, if desired, labeled. NOTE: The labeling of any object to which other objects, devices, pictures, etc., have been assigned, is not required in order to permit the assignment(s). These can be completely effected by the use of a line or arrow with an accompanying logic or its equivalent. As shown in FIG. 11, each folder of array 52 may be identified by a respective color. Each facet may have unique folder arrays, whereby a folder of a particular color on one facet is distinguished from a folder of the same color on another facet of the same cube 51. Thus the green folder of array 53 on the active facet of cube 51 is completely distinct with respect to the green folder of the array 54 on the oblique side facet of cube 51. Thus an enormous amount of information may be stored, and/or labeled, and/or displayed, and made readily available to the user on a single storage/display/action cube. Note that other facets of the cube 51 may contain completely different forms of items, such as the text stored on the top oblique facet of cube 51 or an array of switches on the bottom facet of the cube. This flexibility in storing combinations of disparate items applies to all storage/display/action cubes described herein.

Figure 12:
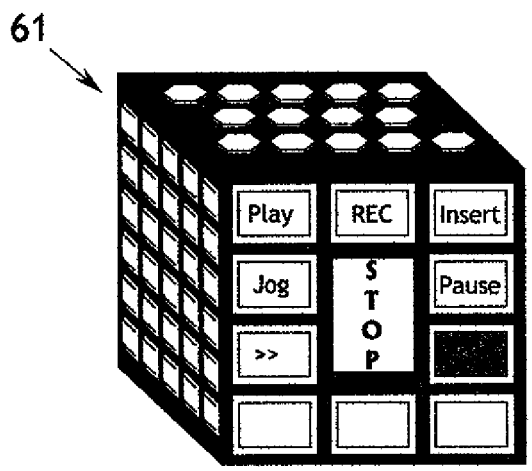
FIG. 12 is a depiction of a storage/display/action cube having a plurality of active switches assigned to various facets thereof.

With regard to FIG. 12, a cube 61 may receive assignment of one or more switches, which are active devices that control the operation of one or more functional devices, equipment, graphic objects, pictures, video, text, audio, etc. For example, the active facet of cube 61 is provided with a plurality of switches that control video and audio playback, including Play, Record, Insert, Jog, Stop, Pause, and fast forward and fast reverse. Note that the switches need not be the same size, and may be labeled with color indicia, or be rendered in different colors. Likewise, the switches, such as those shown on the top oblique face, may be any shape or size or layout array.

Items may be represented on the facets of a cube by association with a user selected color, shading, texture, or the like. For instance, the outer perimeter of each facet may be a different color; e.g., green may represent items associated with picture editing, and red may represent items associated with altering audio files.

An important aspect of the storage/display/action cube system is the ability to employ more that one cube onscreen at any time. With regard to FIG. 13, in one example a plurality of cubes are created, each cube being assigned a portion of a song undergoing mixing. Cube 63 is assigned differing lead mixes, including Lead 1A, Lead 1B, and Lead IC. Cube 64 is assigned various mixes of Chorus 2 (a section of a song), and cube 66 is assigned various mixes of Chorus 3 (another section of a song). The user may place a play line 62 onscreen (for example, by drawing a switch, labeling it "Play line", and then tapping it to bring forth the play line 62, and then drag each cube 63, 64, 66 to the play line in the order they are to be heard. By tapping the play line 62, each mix shown on the active presenting facet (the facet that is fully shown) of each cube is played in the sequence determined by its position along the line. Thus an entire song may be constructed and played. For editing purposes, the user may wish to substitute one or more of the other mixes of each segment of the song. For example, as shown in FIG. 14, the cube 66 may be rotated to bring the Chorus 3B to the active facet, and the play line 62 activated once again to hear a different mix of the song. It may be appreciated that a large plurality of cubes may be used in this manner to piece together a song or any form of audio track, or video track, or both.

Figure 13:
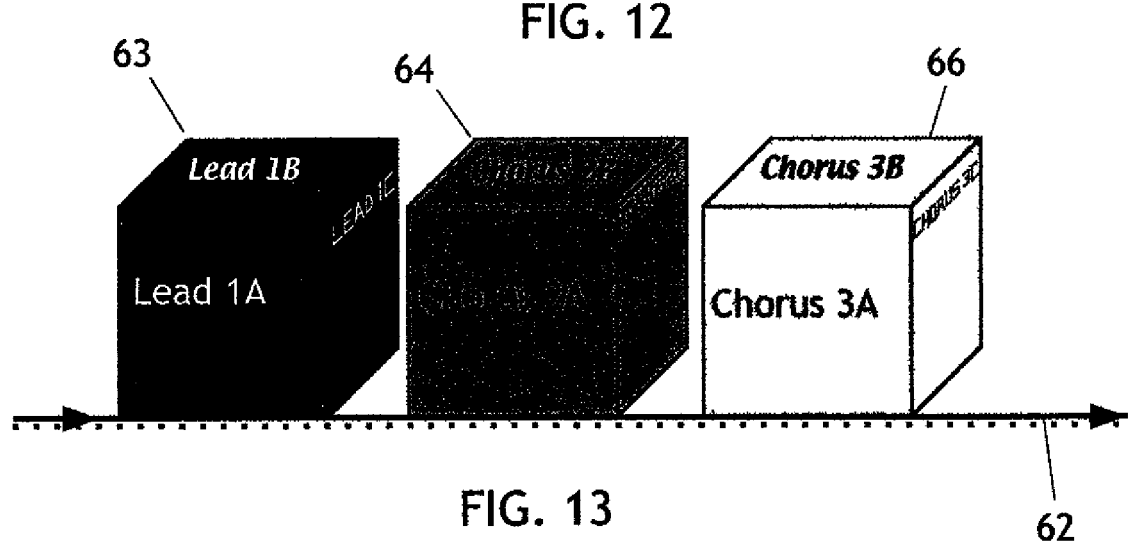
FIG. 13 depicts the use of a plurality of edit blocks assembled to a play line to construct a mix of audio files.
Figure 14:
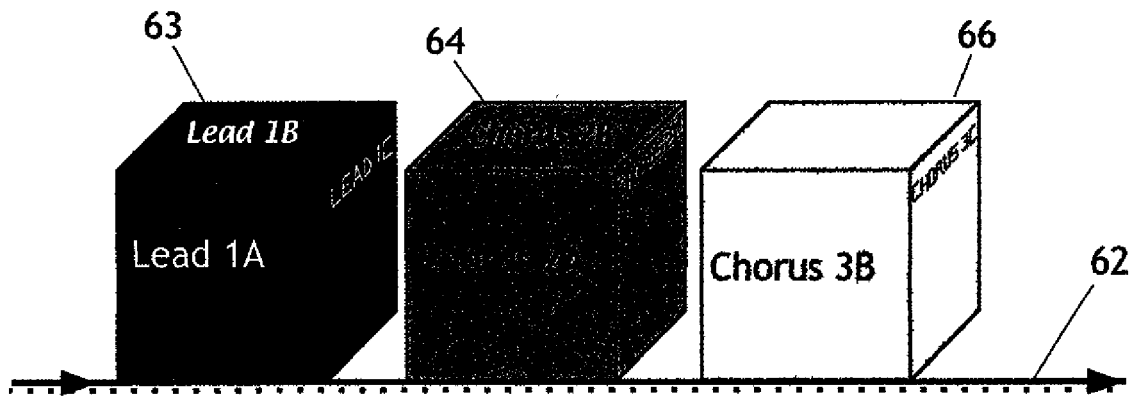
FIG. 14 depicts a play line as in FIG. 13, and shows how an alternative mix may be arranged.

Note that the space between the cubes 63, 64, and 66 may represent elapsed time, so that there is a pause between the segments shown in FIG. 13 or 14. Alternatively, in automatic splice mode the cubes may be played contiguously without regard to the space between the cubes. These techniques may be used to compile music files such as MP3 files into a play list for creating and burning a CD or the like.

Note: Edit cubes as just described above may be used for all kinds of tasks that are not related to audio. For instance, they may be used to sequence pictures, creating a slide show. Additionally, they may be used to segue from one version of a document to another, for example, to enable the user to view various versions of an architectural drawing or view stages of progress in the designing of an automobile or the like.

Figure 15:
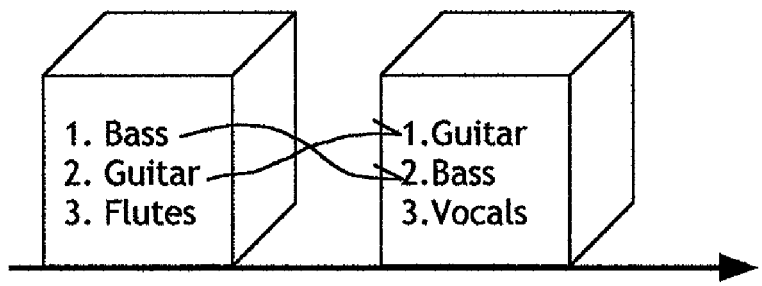
FIG. 15 depicts one technique for crossfading audio files assembled to a play line.

With regard to FIG. 15, when more than one cube includes sound files having the same name, the play line software can automatically create a crossfade between the same files. For example, the "1. Bass" file will crossfade to the "2. Bass" file, and the guitar files will crossfade similarly. The flute to vocal transition remain on separate tracks, and will not be crossfaded.

Figure 16A:
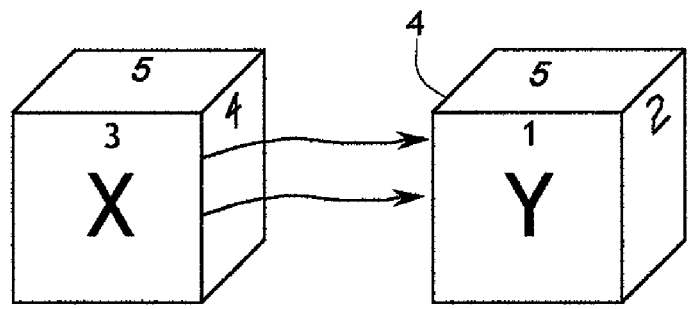
FIG. 16A depicts one technique for operationally combining two cubes side-by-side.
Figure 16B:
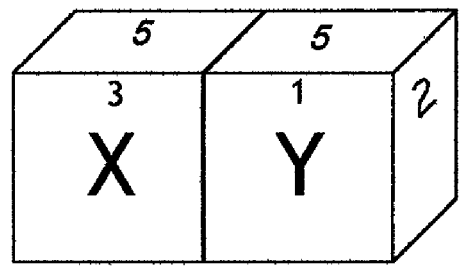
FIG. 16B shows the graphic result.

The techniques depicted in FIGS. 13–15 introduce a more fundamental aspect of the storage/display/action cube, or edit block. The impingement or juxtaposition of two or more cubes in accordance with this invention may impart functional operations between the cubes that are impinged or juxtaposed. For example, with reference to FIG. 16A, two differing cubes X and Y are dragged together. (The object names or symbols assigned to each facet are not shown, to simplify the view.) Assuming, for example, that each cube contains sound files on its active facets, touching the right side of facet 3 of cube X to the left side of facet 1 of the cube Y causes the end of each sound file of cube X facet 3 to be edited onto the beginning of each corresponding sound file stored on block Y, facet 1. ("Corresponding" sound file may be determined by like numbering or order on the respective list of facet contents (see FIG. 7.)

Figure 17A:
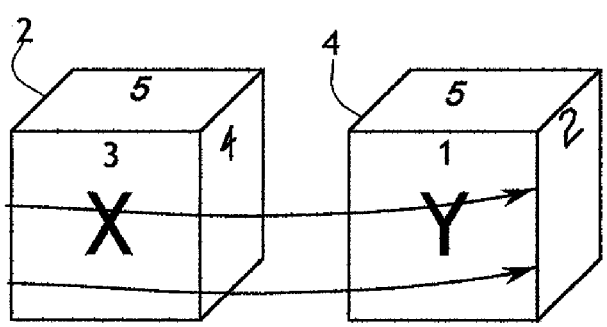
FIG. 17A depicts another technique for operationally combining two cubes side-by-side.
Figure 17B:
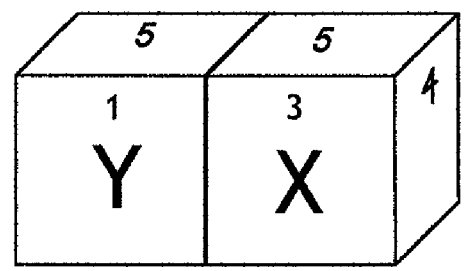
FIG. 17B shows the graphic result.

Conversely, with reference to FIG. 17A, the cube X may be dragged to the right as shown by the arrows, so that the left side of facet 3 of cube X touches the right side of facet 1 of cube Y. The resulting logic of this combination causes the beginning of each sound file of cube X facet 3 to be edited onto the end of each corresponding sound file stored on block Y, facet 1. Thus a desired function or combination may be created by combining two cubes in side-by-side contact, and the orientation of the side-by-side contact may determine the order in which the function or combination will occur.

Figure 18A:
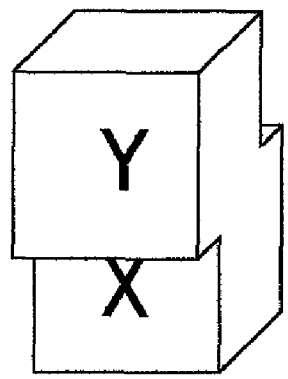
FIGS. 18A and 18B depict the merging (intersection) of two cubes for operational combination of their corresponding active elements.
Figure 18B:
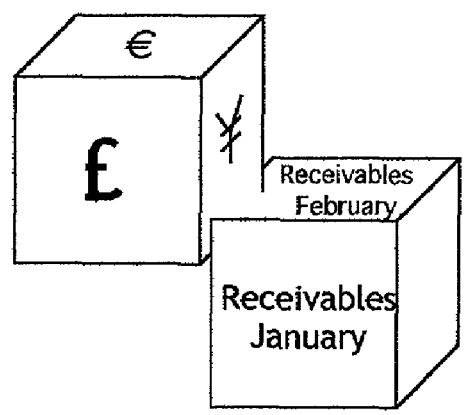

To further extend this concept, as shown in FIG. 18, a cube X may be intersected with a cube Y, so that at least 50% of cube Y's surface covers cube X or vice versa. (The object names or symbols assigned to each facet are not shown, to simplify the view.) This action commands that the sound files stored in the active facet of block Y are mixed in a user-defined ratio (i.e., 1:1 ratio) with the corresponding files in the active facet of block X. For purposes of this example, the "active facet" is the facet directly facing the user. In a broader context, as shown in FIG. 18B, one cube may include files such as spreadsheet data (Receivables January, Receivables February, etc.), and the other cube may contain currency conversion data (dollars, pound Sterling, Yuan, Euro, etc), and the intersected cubes cause all price values to be converted to other currency denominations depending upon which currency value is overlapped with which spreadsheet data.

Figure 19A:
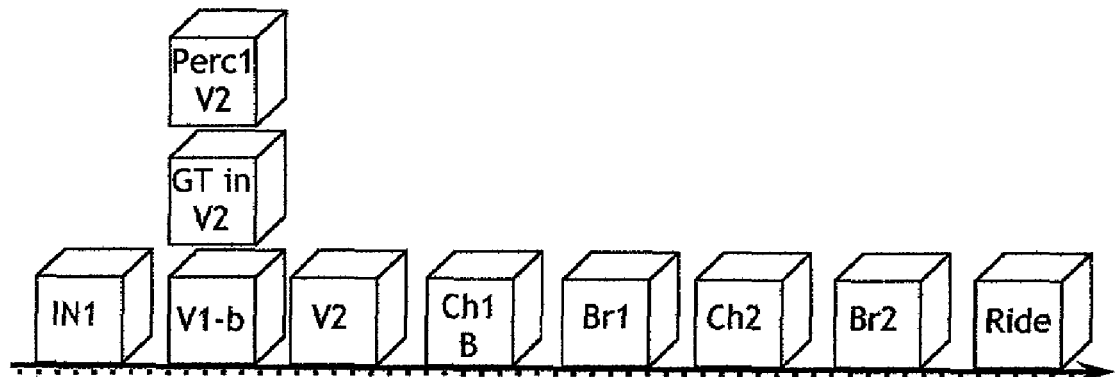
FIG. 19A depicts another technique for combining a plurality of cubes having audio files on a play line to create an audio mix.

Returning to the play line concept, FIG. 19A depicts a plurality of edit blocks arrayed along a play line 72. On the active facet of each edit block there is a sound file representing an audio track, which is a portion of a song. The edit blocks are placed in the order that the user wishes them to be played, as indicated by the arrow of the play line 72. Note that the vertical stack of edit blocks at one position along the play line 72 determines that those three sound files are played simultaneously. The blocks may be moved by dragging them to different positions along the line, or removing and replacing them, so that different mixes of a given musical piece (or audio program, in general) may be tried, edited, retried, and completed with a minimum of effort. The spaces between the edit blocks may comprise silent intervals, or may be defaulted to indicated no silent interval. Likewise, the transition from one sound file to the next may be carried out with a user defined crossfade, or may be indicated individually between selected edit blocks.

Figure 19B:
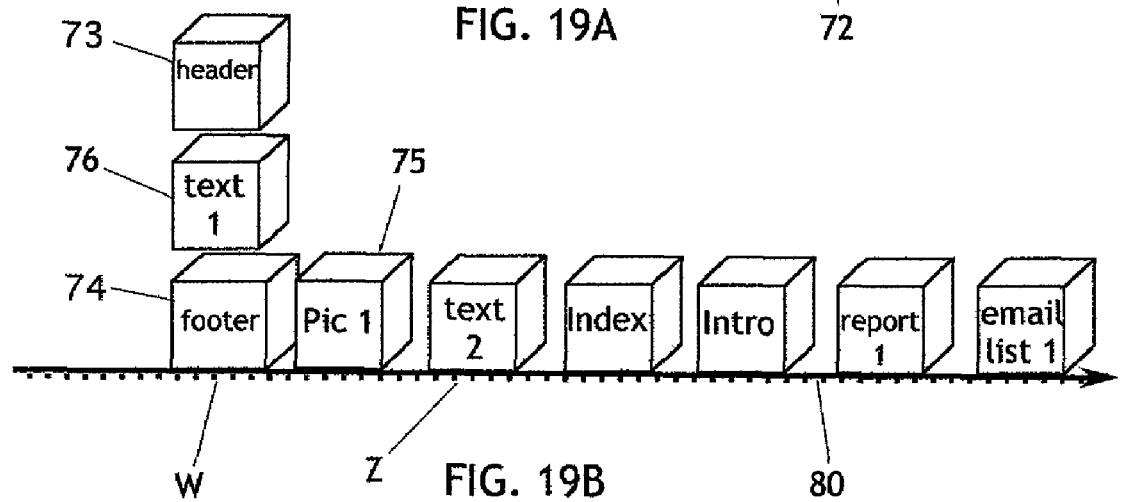
FIG. 19B depicts a technique for combining a plurality of cubes having text and image files to create a report document.

Referring to FIG. 19B, edit blocks may be used to edit text and graphic presentation material. A letter head is assigned to block 73, facet 1, a footer to block 74, facet 1, pictures to block 75, facet 1 and multiple pages of text are each assigned to a separate block 76. In this example a play line, or, more precisely, an assembly line 80 is placed onscreen. Stacking multiple edit blocks (73, 74, and 76) on top of each other produces the assembly of a single page with all of the data represented on each block's active facet present. To see this edited together the user touches the assembly line below this stack at point W. Touching point W will produce a finished page of text that consists of a header, text 1, and a footer. Touch below Z on the assembly line will produce finished pages of text with the header from block 73, footer from block 74, text from cube 76, photo pic 1 from edit block 75, and text from text 2. Text may comprise sentences, paragraphs, chapters, or the like. Thus a document may be put together simply and visually, and may be re-ordered, edited, augmented, or cut with ease.

Figure 20:
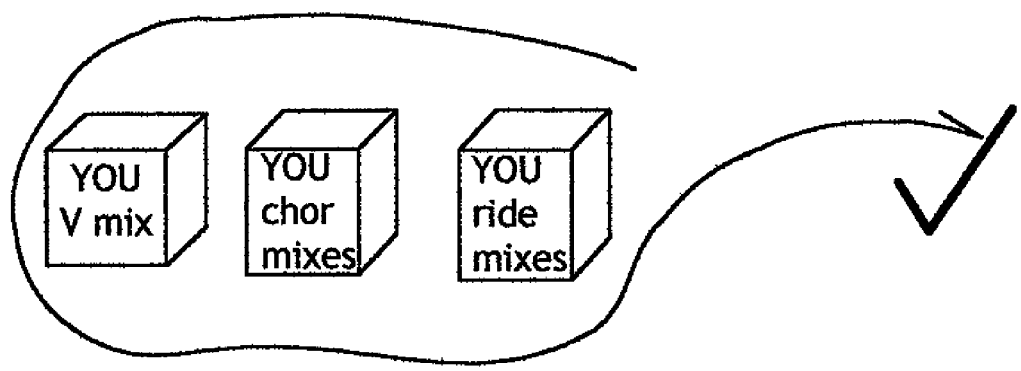
FIG. 20 depicts the use of arrow logics to assign a plurality of cubes to an onscreen functional element.

With regard to FIG. 20, a plurality of edit blocks containing sound files for a particular song (here, the song "YOU") may be assigned by arrow logic or line logic to an onscreen symbol, such as the magenta check mark. Thus drawing a magenta check mark onscreen can immediately call forth the edit blocks that contain the tracks for the song "YOU". These edit blocks may comprise the edit blocks having the audio tracks on their active facets in the order resulting from the processes as in FIG. 19 or FIGS. 13–14; that is, mixes are tried, reordered, swapped, and edited, and the chosen mix may be stored in a single onscreen object. Or, these edit blocks may have originated in any other manner described herein.

Figure 21:
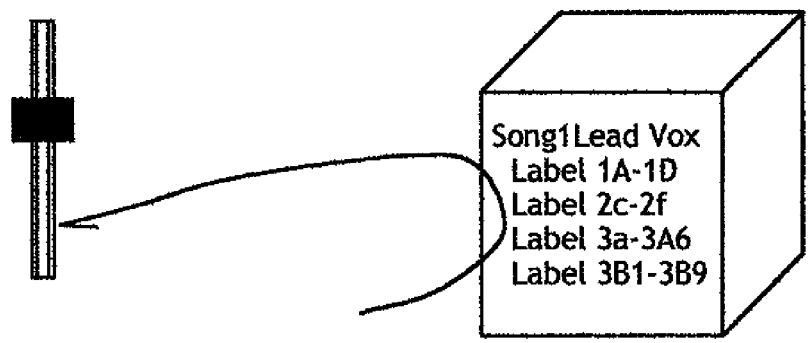
FIG. 21 depicts one arrow logic technique for applying an onscreen control to a plurality of files on the active facet of a cube.

Audio files may be combined with onscreen functional objects. As shown in FIG. 21, for example, an arrow logic is drawn from the active facet of an edit block to an onscreen fader controller. The arrow does not encircle the edit block, so the entire block is not selected, but the arrow intersection with the active facet determines that all the audio files on that facet will be controlled by the fader (here, a volume fader). In other words, the volume adjustment offset that is created by moving the fader up or down will be applied equally to each separate file listed on this facet.

Note with regards to FIG. 21 that the line or arrow may be drawn in either direction to affect the needed control link, depending upon the definition of the arrow/line logic being used. For instance, if the arrow or line is drawn from the facet to the fader the arrow logic may be defined as: "control the objects from which the arrow or line is drawn by the device to which the arrow or line is drawn." The opposite of this, drawing the line or arrow from the fader to the facet would be supported by this logic definition: "control the objects to which the arrow or line is drawn by the device from which the arrow or line is drawn".

Figure 22:
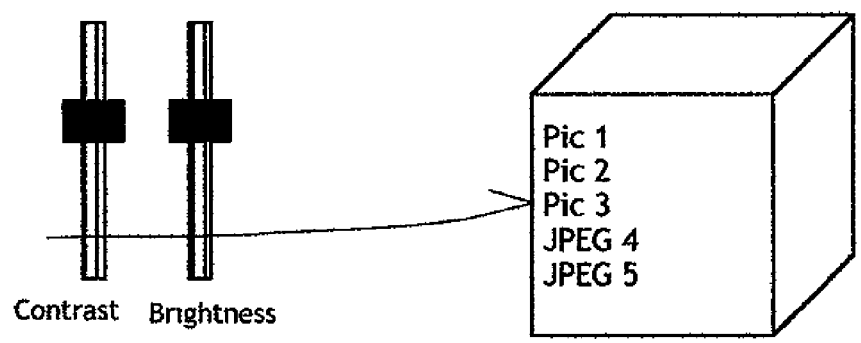
FIG. 22 depicts another arrow logic technique for applying an onscreen controls to a plurality of files on the active facet of a cube.

Referring to FIG. 22, two faders are being assigned to control the contrast and brightness respectively for multiple pictures which are stored on a facet of a cube. In this case, a link is established between each fader and the cube facet by methods herein described. Then moving the contrast fader will change the contrast of any selected picture on the cube facet to which this fader has been linked. Moving the brightness fader will change the brightness of any selected picture on this cube facet. If no pictures are selected, then all of the pictures could be controlled by the contrast and brightness faders. Note: there are many ways to select something on a cube's facet, e.g., click on it, drag through it to highlight it, touch it or click on it, verbally select it, etc.

Any storage/display/action cube described herein may be removed from the display using any of the arrow logic techniques described in U.S. patent application Ser. No. 09/880,397, filed Jun. 12, 2001 now U.S. Pat. No. 6,883,145. One erasing technique is to draw an X over the cube to be removed, and the system recognizes the drawn figure and implements the command that is assigned to it: erase from the display the object in contact with the X. Another erasing technique is to scribble a line over the cube to be removed, and this gesture is recognized by the software and the associated command, erasure, is carried out on the cube. Still another method would be to right click on the cube and in its info window, which appears onscreen, select "Delete". Other erasure techniques may be designed and defined within the arrow logic system.

Figure 23A:
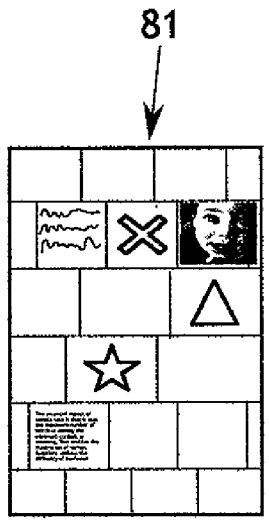
FIGS. 23A–23C depict a cylinder in plan view, a cylinder object in perspective view, and a spheroid object in perspective view, respectively, each object containing assignments of items.

All of the characteristics, traits, functions, and utility ascribed to the storage/display/action cube in the description above may be applied to onscreen objects of various other geometric configurations. For example, the cube, which is a hexahedron, may be seen as merely one of a group of polyhedrons that have regular facets to which items may be assigned. For example, an octahedron or dodecahedron may be rendered onscreen, with each facet thereof capable of accepting assignment of items, storage and display of the items, and rotatable to display any selected facet. More facets would be at least partially visible, giving more visual cues to the contents of a greater number of facets. However, the rectangular format of the facets of a cube is more consonant with the rectangular formats of photos, text layouts, and the like. In addition, a sphere object, either a circular sphere or an elliptical spheroid could be used to replace a multi-faceted object. Sections of the sphere could be designated as assignable areas where objects, devices, pictures, text, graphics, etc., can be assigned, stored, recalled and controlled as described herein and shown in FIG. 23C.

Figure 23B:
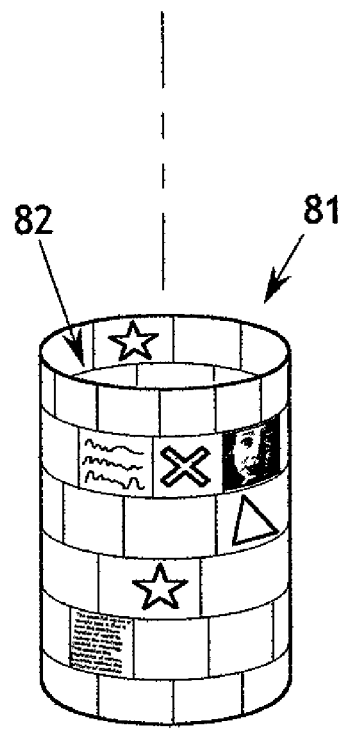
Figure 23C:

The sphere or spheroid object is one example of a closed curved object that may be utilized in the present invention. With regard to FIGS. 23A and 23B, a cylindrical or barrel object 81 may appear in full elevation plan view, as in FIG. 23A, and may be tapped or otherwise activated to display a 3-D view of the barrel 81. The barrel 81 includes a plurality of items assigned to the surface thereof, and the user may laterally drag a vertical edge of the perspective view to rotate the barrel and bring into view those items that may be hidden from direct visualization. Also, note that the interior surface of the barrel 81 may be assigned a plurality of items, and the user may view the interior surface of the barrel by activating it, such as by double clicking on the interior surface 82 of the barrel as shown in FIG. 23B. The items on the interior and exterior surface may be arrayed in annular rows, or may be situated either by the user placement on the curved surface or by any desired regular or irregular placement scheme. Note that the items displayed in FIG. 23B are depicted in proper perspective for the curved surface of the barrel 81. NOTE: the interior of any 3-D object may have items assigned to it and/or represented on it.

Figure 24:
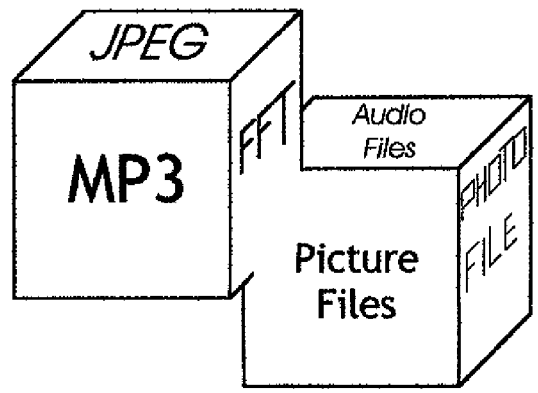
FIG. 24 depicts a transform cube being intersected with a cube having files that may be processed by the transform cube.

All of the editing and assembling techniques described above with regard to audio files or audio tracks may be applied equally effectively to video editing, text editing (for example, assembling paragraphs or chapters stored on separate cubes), or any task in which the final product is assembled incrementally from sources stored in a plurality of edit blocks. As one example, shown in FIG. 24, a cube having a plurality of transform functions assigned to it, such as JPEG, MPEG, Fast Fourier Transform, and the like, may be constructed onscreen. This transform cube may be rotated and brought into intersection with a cube storing photo files, video/audio files (media files in general), so that the storage cube present a user selected file and the transform cube presents a transform selected to process the file. Thus sophisticated transform functions may be readily available and easily applied.

In general, a cube may be utilized to cause one or more items represented on the cubes to become involved in an operation or process that includes at least one item from the cube. Such operations or processes may (or may not) include using a play or display line to display, play (if applicable) or edit audio or video files, pictures, data files such as text or spreadsheet files, financial data, and the like.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In an electronic device that accepts user inputs and includes a screen display, a method for storing, displaying, and recalling items, including the steps of:
    displaying a view of a 3-D object;
    displaying at least one item;
    assigning said at least one item to said 3-D object; including drawing an arrow logic line between the item to a facet and the surface of said object, said at least one item being stored thereafter in said 3-D object and being visually represented on the surface of said 3-D object;
    thereafter accessing said at least one item by interacting with said item as represented on said surface;
    further including the step of the user calling forth said 3-D object onscreen by drawing onscreen a square and an arc intersecting said square, and thereafter displaying said 3-D object onscreen.

2. In an electronic device that accepts user inputs and includes a screen display, a method for storing, displaying, and recalling items, including the steps of:
    displaying a view of a 3-D object;
    displaying at least one item;
    assigning said at least one item to said 3-D object, including touching or clicking and dragging said onscreen item to a user selected facet of said 3-D object;
    further including the step of the user calling forth said 3-D object onscreen by drawing onscreen a square and an arc intersecting said square, and thereafter displaying said 3-D object onscreen.

3. The method of claim 2, further including the step of providing an onscreen 3-D object inkwell, and selecting a color from said inkwell in which to draw said square and arc, thereafter said 3-D object being rendered in the selected color.

4. In an electronic device that accepts user inputs and includes a screen display, a method for storing, displaying, and recalling items, including the steps of:
    displaying a view of a 3-D object;
    displaying at least one item;
    assigning said at least one item to said 3-D object; including drawing an arrow logic line between the item to a facet and the surface of said object, said at least one item being stored thereafter in said 3-D object and being visually represented on the surface of said 3-D object;
    thereafter accessing said at least one item by interacting with said item as represented on said surface;
    further including an assembly line displayed onscreen, and including the step of dragging a plurality of said 3-D objects onto said assembly line in a user defined order, said active facets of said plurality of 3-D objects having corresponding data files, said data files being displayed as the assembly line beneath each 3-D object and stack of 3-D objects is touched.

5. In an electronic device that accepts user inputs and includes a screen display, a method for storing, displaying, and recalling items, including the steps of:
    displaying a view of a 3-D object;
    displaying at least one item;
    assigning said at least one item to said 3-D object, including touching or clicking and dragging said onscreen item to a user selected facet of said 3-D object;
    further including an assembly line displayed onscreen, and including the step of dragging a plurality of said 3-D objects onto said assembly line in a user defined order, said active facets of said plurality of 3-D objects having corresponding data files, said data files being displayed as the assembly line beneath each 3-D object and stack of 3-D objects is touched.

* * * * *